(12) United States Patent
Tesovic et al.

(10) Patent No.: US 10,798,119 B2
(45) Date of Patent: *Oct. 6, 2020

(54) COMMAND INTERCEPTION

(71) Applicant: CMD WATCH SECURITY INC., Vancouver (CA)

(72) Inventors: Milun Tesovic, Burnaby (CA); Jacob King, Vancouver (CA); Martin Bowyer, Vancouver (CA); Jason Taylor, North Vancouver (CA); Matthew Giassa, Vancouver (CA)

(73) Assignee: CMD WATCH SECURITY INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,222

(22) Filed: Dec. 9, 2019

(65) Prior Publication Data
US 2020/0112581 A1    Apr. 9, 2020

Related U.S. Application Data

(63) Continuation of application No. 15/698,286, filed on Sep. 7, 2017, now Pat. No. 10,536,474.

(51) Int. Cl.
*H04L 29/06*    (2006.01)
(52) U.S. Cl.
CPC ...... *H04L 63/1425* (2013.01); *H04L 63/0236* (2013.01); *H04L 63/1441* (2013.01); *H04L 63/30* (2013.01); *H04L 63/0823* (2013.01); *H04L 63/12* (2013.01); *H04L 63/306* (2013.01); *H04L 2463/082* (2013.01)

(58) Field of Classification Search
None
See application file for complete search history.

(56) References Cited

U.S. PATENT DOCUMENTS

2017/0270296 A1* 9/2017 Kraemer ............. H04L 63/1425

* cited by examiner

*Primary Examiner* — Craig C Dorais
(74) *Attorney, Agent, or Firm* — Perry + Currier Inc.

(57) ABSTRACT

A system and method for intercepting commands issued to a host server. An agent is installed on the host server and configured to intercept commands issued to the host server and to transmit indications of said commands to a collector for logging and evaluation. The collector includes rules for determining whether a command issued to the host is to be blocked. Collector rules may be informed by supplementary information from third party information systems. The agent queries the collector for whether a command is to be blocked, and also include rules for blocking commands without evaluation by the collector. Indications of intercepted commands are stored by the collector in databases accessible by an administrator for monitoring activity on the host server and for configuring rules for blocking commands issued to the server.

16 Claims, 7 Drawing Sheets

COMMAND INTERCEPTION

CROSS-REFERENCE TO RELATED APPLICATIONS

This application is a continuation application of U.S. Ser. No. 15/698,286, filed Sep. 7, 2017, which is incorporated herein by reference.

FIELD

The present invention relates to computer security.

BACKGROUND

Access to a server, for data retrieval or operational purposes, can be controlled by the implementation of user-based restrictions in the server operating system. User-based restrictions may be used, for example, to limit access to a particular directory on the server to a single user, or may limit the ability to execute a particular application or command on the server to authorized users, or to a particular group of users. In some instances, the server may require secondary authorization from a user, such as the input of an administrator password, to execute a particular command on the server. Attempts by users to access protected files or to execute prohibited commands may also be logged for review by an administrator.

The use of such user-based restrictions, however, does not provide for real-time monitoring of command line commands being issued by users or access of files or folders by users. Furthermore, the use of such user-based restrictions often provides no contextual control.

SUMMARY

According to an aspect of the specification, a system for intercepting commands issued to a host is provided. The system includes a collector configured to receive and log indications of commands. The system includes an agent installed on the host, the agent comprising an agent library comprising an overriding function to override an expected function callable on the host by a program executable by the host, the overriding function comprising instructions to initiate transmission to the collector an indication of a command that invokes the expected function, initiation of transmission being responsive to the command being issued to the host, the overriding function further comprising instructions to implement the expected function. The system includes a server in communication with the collector and configured to retrieve and output the indications of commands logged by the collector.

According to another aspect of the specification, a collector for intercepting commands issued to a host is provided. The collector includes a network interface for receiving indications of commands transmitted from the host, initiation of transmission being responsive to the command being issued to the host. The collector includes a storage for storing indications of commands transmitted by the host and for storing programming instructions. The collector includes a processor in communication with the network interface and the storage, the processor configured to log indications of commands received by the network interface.

According to another aspect of the specification, a non-transitory computer-readable medium containing programming instructions for causing a computer to perform a method of intercepting commands issued to a host is provided. The method includes receiving a command at the host, invoking an overriding function which overrides an expected function callable on the host, the overriding function comprising instructions to transmit an indication of the command to a collector, and transmitting an indication of the command to the collector.

Other features and advantages of the present invention are described more fully below.

BRIEF DESCRIPTION OF THE DRAWINGS

Embodiments of the present invention will now be described, by way of example only, with reference to the attached Figures, wherein.

DETAILED DESCRIPTION

The specification relates to a system and method for intercepting commands issued to a host server or similar computing device (hereinafter referred to simply as the "host"). Interception of commands issued to a host provides an opportunity for evaluation of whether the intercepted command should be blocked or permitted to be executed on the host according to contextual factors. It may be desirable, for example, to provide access to a particular directory on the host to a particular group of users during the working hours of the time-zone of a particular region, but require secondary authentication from any user outside of those working hours, or from any user located outside of that region. With the increasing tendency for teams of developers to collaborate across various regions and time-zones, and with a growing need for systems to implement fine-grain regulatory compliance, greater contextual control access to servers is desirable.

According to systems and methods described herein, commands that are issued to the host are intercepted by an agent installed on the host. The agent includes a library of functions which override existing library functions which are callable, and expected, on the host. The overriding functions include instructions to transmit indications of commands issued to the host to a collector server or similar computing device (hereinafter referred to simply as the "collector") for logging and evaluation. Commands issued to the host include command line commands issued to the host.

The collector may be programmed with collector rules for determining whether the command issued to the host should be blocked or permitted. The collector is in communication with third party information systems, such as global positioning and timekeeping systems, which inform evaluation of collector rules.

The agent may include local rules for determining whether a command issued to the host should be permitted or blocked where, for example, querying the collector is unnecessary, or where connectivity to the collector is lacking. The agent may comprise an agent manager, a program installed on the host, for caching transmissions to the collector.

Indications of command line commands logged by the collector may be stored in databases. The databases and the collector are accessible by a controller server or similar computing device (hereinafter referred to as the controller) having a controller interface, whereby an administrator may monitor commands issued to the host in real time or near real time, access logged activity, adjust collector rules, push local rules to the host, and take other administrative actions.

Figure 1:
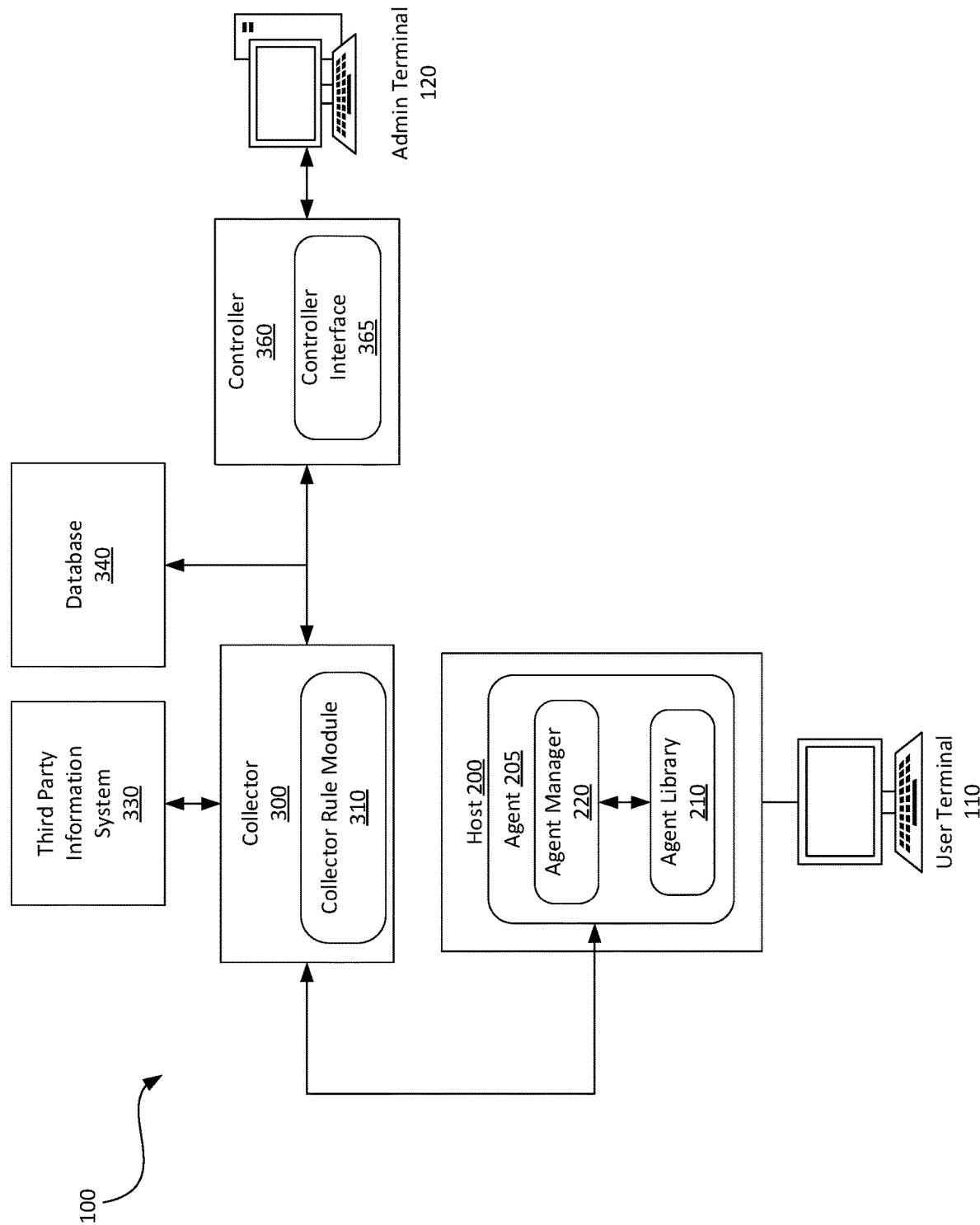
FIG. 1 is a schematic diagram depicting a system for intercepting commands issued to a host, according to a non-limiting embodiment.

FIG. 1 shows a system 100 for intercepting commands issued to a host, according to a non-limiting embodiment. In the present embodiment, command line commands issued to a host are intercepted. As discussed below, it is contemplated that the system can be used to intercept other kinds of commands issued to the host, including for example, commands input directly through an input device coupled with the host, commands input through a shell script, an application containing instructions to call a function, or through a guided-user-interface.

The system 100 includes user terminal 110 in communication with a host 200. User terminal 110 is used to access the host 200 and issue commands to the host 200. Although in the present embodiment, one user terminal 110 is shown, a plurality of user terminals 110 is contemplated in many implementations. The host 200 includes an agent 205. Agent 205 comprises an agent library 210 in communication with an agent manager 220, discussed in greater detail in FIGS. 6-7, below. Briefly, agent library 210 intercepts command line commands issued to the host 200 by user terminals 110, evaluates local rules 213 (FIG. 7) to determine whether to block the intercepted command line commands, communicates with agent manager 220 for caching, and coordinates with a collector 300, where collector rules 313 (FIG. 7) may be used to determine whether to block the intercepted command line commands or take other action.

Figure 2:
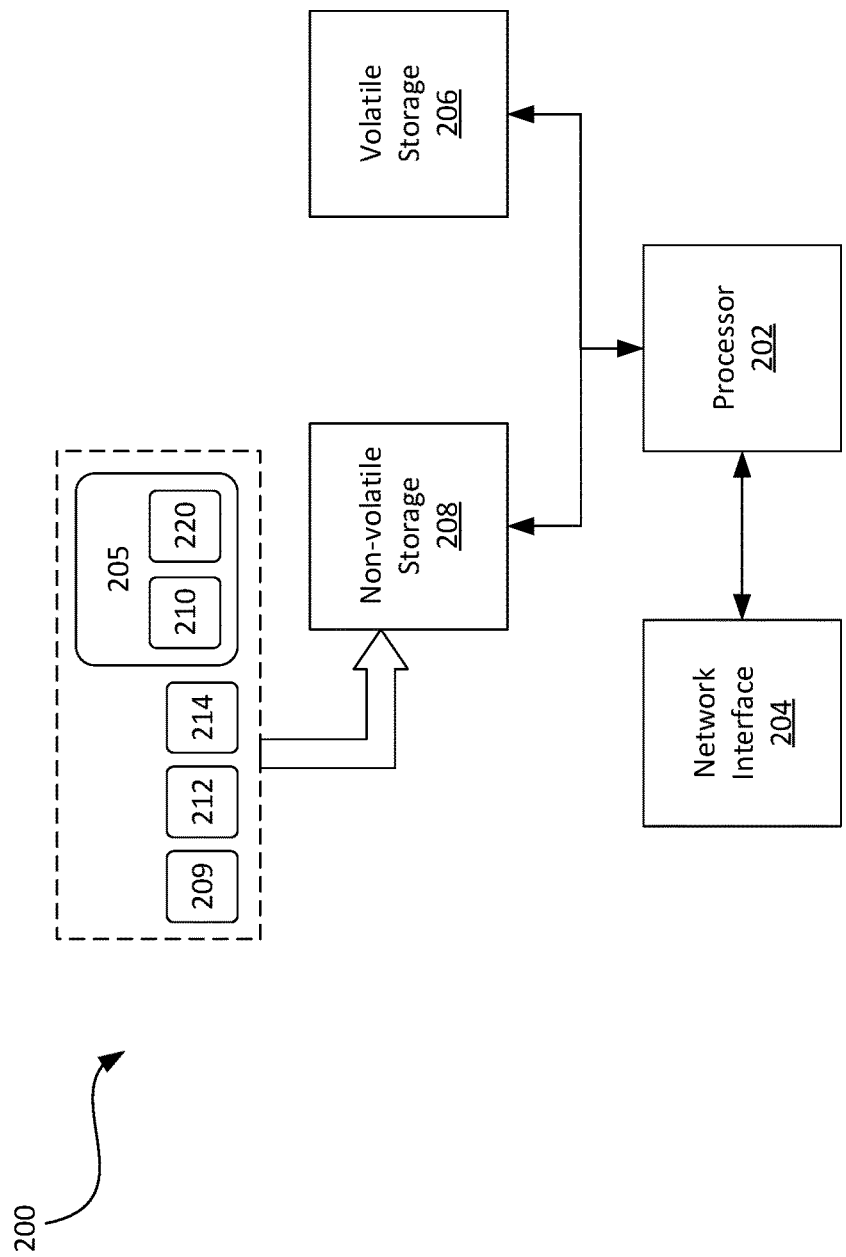
FIG. 2 is a schematic diagram depicting the host of FIG. 1, according to a non-limiting embodiment.

As shown in greater detail in FIG. 2, host 200 includes a computing device running a server application with a storage device, communication device, and processor. User terminals 110 comprise computing devices running a user application with a storage device, communication device, and processor. User terminal 110 and host 200 communicate via one or more computer networks, which can include the internet, a Wi-Fi network, a local-area network (LAN), a wide-area network (WAN), a wireless cellular data network, a virtual private network (VPN), serial communication, a combination of such, and similar.

System 100 further includes a third party information system 330 in communication with collector 300, which provides supplementary information to collector 300 to inform evaluation of collector rules 313. In the present embodiment, collector rule module 310 is a program comprising a set of collector rules 313 for determining whether a command line command is to be blocked or whether other action is to be taken, as discussed in greater detail below. Although in the present embodiment, one third party information system 330 is shown, a plurality of third party information systems 330 is contemplated in many implementations.

The system 100 further includes database 340 for logging data related to intercepted command line commands, as received from the collector 300. Although in the present embodiment, one database 340 and one collector 300 is shown, a plurality of databases 340 and collectors 300 is contemplated in many implementations. In some embodiments, databases 340 are relational databases, and it is contemplated that in other embodiments databases 340 are non-relational.

System 100 further includes a controller 360 having a controller interface 365 (referred to herein as interface 365) for viewing intercepted command line commands issued to the host, as stored by the collector 300. Although in the present embodiment, one controller 360 is shown, a plurality of controllers 360 is contemplated in many implementations.

In some embodiments, the interface 365 may be used for viewing active user sessions, accessing intercepted command line commands logged in a database 340, adjusting collector rules 313 on the collector 300, pushing local rules 213 to the host 200, and setting automatic follow-up actions to be carried out by collector 300. The interface 365 and configuration of local and collector rules 313 is described in greater detail below in FIG. 7.

Collector 300, third party information system 300, database 340, controller 360, and admin terminal 120, similarly communicate via one or more computer networks, which can include the internet, a Wi-Fi network, a LAN, a WAN, a wireless cellular data network, a VPN, serial communication, a combination of such, and similar.

Several collectors 300 and databases 340 may employed for distributing query demand and storage load. In some embodiments, query demand and storage load is managed using DNS load balancing, including Round Robin, Weighted Round Robin, Least Connection, Weighted Least Connection, or other NDS load balancing techniques. It is contemplated that in other embodiments other load balancing techniques may be employed. In embodiments where command line commands from different hosts 200 are to be stored on the same database 340, access to the relevant data may be controlled by key and certificate management. Similarly, in embodiments in which a plurality of admin terminals 120 are to be given access to a subset of logs stored on databases 340, key and certificate management techniques may be employed to ensure security of user information.

FIG. 2 is a schematic diagramming depicting host 200, according to a non-limiting embodiment. Host 200 comprises a network interface 204, which allows it to communicate with user terminals 110 and collector 300. The network interface 204 is connected to a processor 202, which can be configured to run programs. Processor 202 is connected to volatile storage 206 and non-volatile storage 208. Volatile storage 206 may include random-access memory (RAM) or similar. Non-volatile storage 208 may include a hard drive, flash memory, and similar. Non-volatile storage 208 provides a non-transitory computer-readable medium containing programming instructions for performing a method of intercepting commands issued to host 200. Host 200 executes an operating system, such as a LINUX operating system, and may further execute an application, such as a shell program 212 which presents a command line interface to users at user terminals 110. Host 200 may also execute server application programs 214. The operating system and applications may be stored in non-volatile storage 208.

Also stored on non-volatile storage 208 is a library 209 of functions for performing tasks on the host 200. The library 209 may comprise statically linked functions as well as dynamically linked functions, where the dynamically linked functions may be shared by the shell 212 and application 214 may each depend on statically linked and dynamically linked functions for carrying out tasks on the server. One example of a dynamically linked function library is "libc", a standard library for the C programming language. Dynamically linked functions which are expected by the shell 212 or application 214 when called are referred to herein as expected functions. The process by which the shell 212 and application 214 rely on library 209 for expected functions to carry out tasks on the server is described in greater detail below with references to FIGS. 4-7.

Also stored on non-volatile storage 208 is agent 205. Agent 205 comprises agent library 210, which comprises overriding functions which override expected functions of library 209. As described in greater detail below with reference to FIGS. 4-7, the overriding functions comprise instructions to initiate transmission to the collector 300 an indication of an intercepted command line command that would invoke an expected function. The overriding functions may comprise local rules 213 to determine whether to block execution of the intercepted command line command, or to query collector 300 for determination of whether to block the intercepted command line command according to collector rules 313. Transmission may be responsive to a command line command being issued to the host. The overriding functions also include instructions to implement the expected function being overridden, by, for example, calling the expected function, or by containing programming instructions to implement a function substantially similar to that of the expected function. A command line command which invokes an overriding function from agent library 210 is referred to as a command line command that has been intercepted.

Agent 205 also comprises agent manager 220, which may be used to queue transmissions of intercepted command line commands and queries to the collector 300. As discussed in greater detail below, instructions to block an intercepted command line command may be present within an overriding function of agent library 210, in the agent manager 220, or on the collector 300.

Figure 3:
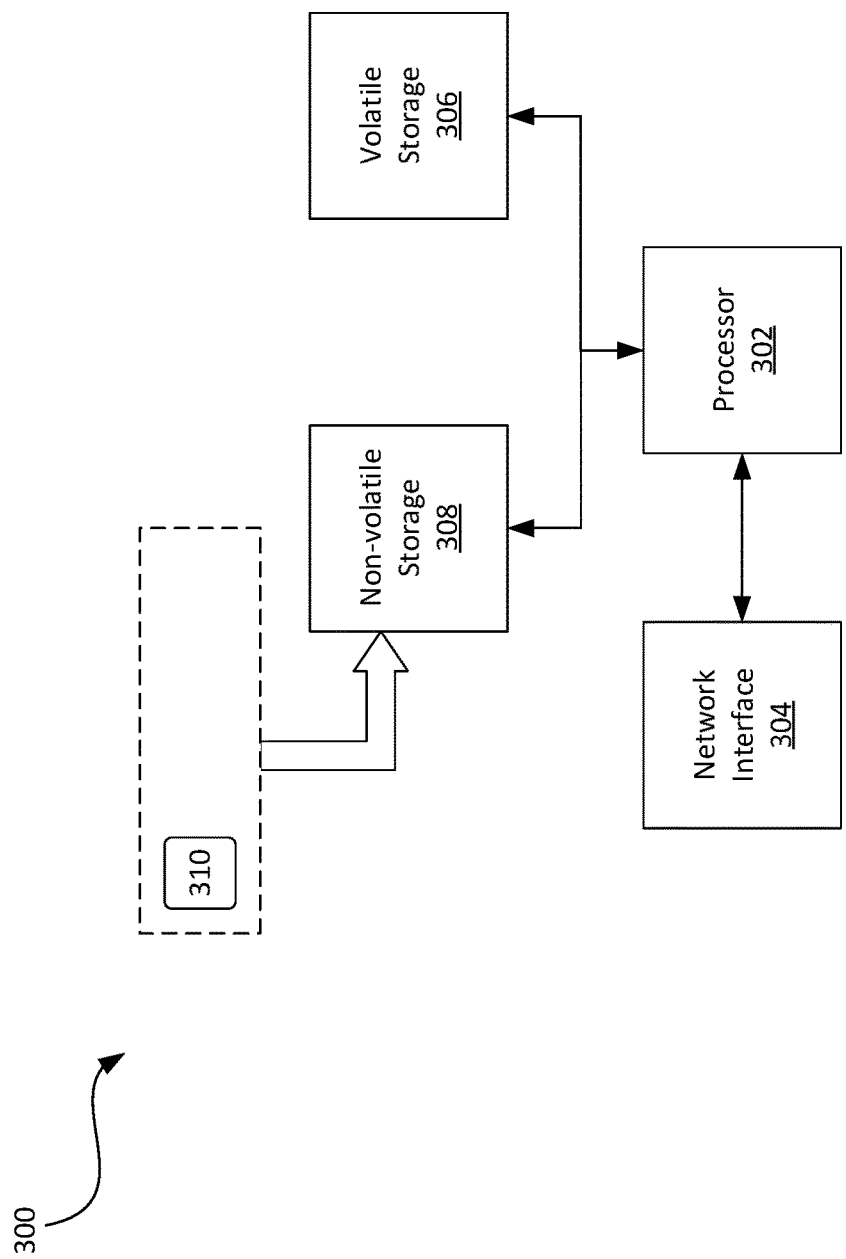
FIG. 3 is a schematic diagram depicting a collector, according to a non-limiting embodiment.

FIG. 3 is a schematic diagram depicting collector 300, according to a non-limiting embodiment. Similar to host 200, collector 300 comprises a processor 302, network interface 304, volatile storage 306 and non-volatile storage 308. Non-volatile storage 308 provides a non-transitory computer-readable medium containing programming instructions for implementing collector rules 313. Stored on non-volatile storage 308 is a collector rule module 310, a program comprising a set of collector rules for determining whether a command line command is to be blocked or whether other action is to be taken, as discussed in greater detail below.

Command line commands issued by user terminals 110 to host 200 can be intercepted by agent library 210, and indications of the command line commands can be transmitted to the collector 300 for logging and storage at databases 340, and for monitoring by admin terminals 120 through controller 360.

Furthermore, local rules 213 in the agent library 210 or collector rules 313 in the collector rule module 310 may block intercepted command line commands from execution on the host 200.

Figure 4:
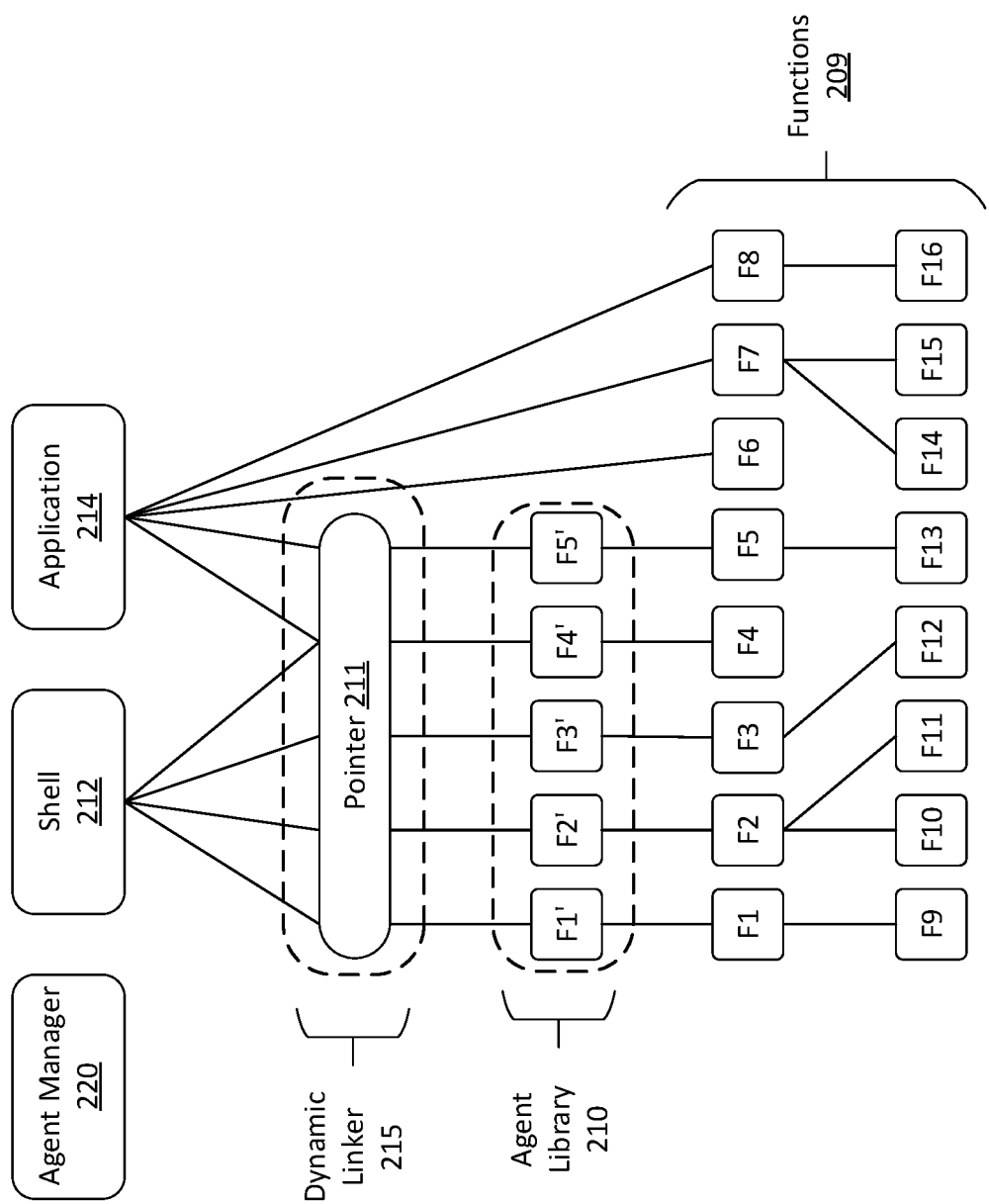
FIG. 4 is a diagram depicting program architecture including the library of functions of FIG. 1 overridden by an agent library, according to a non-limiting embodiment.

FIG. 4 is a diagram depicting the program architecture of a library 209 of functions callable on host 200, according to a non-limiting embodiment. The architecture includes a shell 212 and an application 214, each depending on the library 209 of functions, the library 209 comprising functions F1, F2, F3, . . . , F16, and further includes dynamic linker 215.

The shell 212 is a command line interpreter that receives commands issued to the host server by, for example, a user terminal. In the example of a host server running a LINUX operating system, the shell 212 comprises a LINUX shell. In the present example, shell 212 can be used to call functions F1, F2, F3, and F4. It is contemplated that in other embodiments, a host server may run any UNIX or LINUX operating system or any distribution thereof, such as DEBIAN, RED HAT, or UBUNTU.

Application 214 represents an application program executable on the host server. In the present example, application 214 can call functions F4, F5, F6, F7, and F8.

It can be seen that some functions initiate function calls to other functions. For example, function F1 includes a call to function F9, and function F2 includes calls to functions F10 and F11.

Each of the functions F1, F2, F3, . . . , F8, are statically linked or dynamically linked to the shell 212 or application 214. In the present embodiment, functions F1, F2, F3, F4, are dynamically linked to shell 212. Functions F5 and F6 are dynamically linked to application 214, and functions F7 and F8 are statically linked to application 214. Function F4 is shared by shell 212 and application 214.

A program comprises objects, and an object may comprise lists of associated symbols and other objects. In some implementations, an object may comprise a list 402 of symbols provided by the object (not shown), a list 404 of symbols that are needed by the object (not shown), and a list 406 of objects which provide the needed symbols (not shown). Symbols may be associated with either a variable or a function. The present embodiment describes a case where library 209 comprising functions is overridden, but it is contemplated that in other embodiments, a library comprising variables, or a library comprising functions and variables may be overridden.

Dynamically linked functions are linked via dynamic linker 215. The particular linkages of functions shown here are for illustrative purposes only.

Where a function is statically linked to a program, the contents of the program are included at time of linking by a static linker (also known as a link editor). At compile time, the static linker generates the list 402 of symbols provided by the object, the list 404 of symbols needed by the object, and the list 406 of objects which provide the needed symbols.

Where a function is dynamically linked to a program, a pointer in the dynamic linker 215 causes the dynamically linked function to be included later, at run time. At run time, the dynamic linker 215 searches for the needed symbols searching the loaded objects (in the order they were loaded) until it finds a matching symbol name in the list 402 of symbols provided by a loaded object. Once a symbol is matched, the address of the symbol's code segment is linked into the loading object.

In the present embodiment the program architecture further comprises an agent manager 220, and an agent library 210 comprising functions F1', F2', F3', F4', and F5' (hereinafter referred to as overriding functions). Agent library 210 comprises a binary installed on the host 200 which establishes communication with collector 300. In some embodiments, the agent library 210 establishes secured communication between a user process and the agent manager 220. In embodiments including an agent manager 220, agent library 210 establishes communication with agent manager 220, and agent manager 220 establishes In some embodiments, the communication connection between agent library 210 and collector 300 can comprise a web-socket connection requiring an encryption certificate. In some embodiments, connection between agent library 210 and collector 300 may be secured by an authentication key. In the present embodiment, the functions of agent library 210 are made to override expected functions in library 209 by linkages created by pointer 211 after injection into the dynamic linker 215. In other embodiments, more generally, the agent library 210 provides symbols intended to fulfill specific needed symbols before the same symbol is provided by another library.

In the present embodiment, the LINUX operating system includes the environmental variable LD_PRELOAD which specifies a list of libraries for the dynamic linker 215 to load prior to other libraries. In the present embodiment, pointer 211 is a code injection into the dynamic linker 215 comprising instructions to point expected function calls to the overriding functions. In the present embodiment, pointer 211 is loaded into LD_PRELOAD to overwrite the dynamically-linked library comprising functions F1, F2, F3, F4, and F5 by causing other functions, overriding functions F1', F2', F3', F4', and F5', described below, to be the first of such functions found by the dynamic linker 215. Modification of the LD_PRELOAD environmental variable causes the dynamic linker 215 to load the specified shared object before all other objects, thus allowing pre-loaded objects' symbols to be matched prior to any other objects which provided the same symbol. In other embodiments, dynamic linker 215 may be replaced entirely or in part with another system for directing dynamically linked functions.

Although in the present embodiment the dynamic linker 215 is described as redirecting function calls to overriding functions, it is understood that, more generally, the agent library 210 can provide symbols, whether the symbol is associated with a variable or a function.

With the pointer 211 installed, for example, dynamic linker 215 redirects a function call made to an expected function to an overriding function. For example, when an expected function, e.g. F1, is invoked by a command line command, overriding F1' is executed. In the present embodiment, expected functions F1, F2, F3, F4, and F5, are overridden by overriding functions F1', F2', F3', F4', and F5', respectively. After the dynamic loader 215 has matched a function, or symbol, provided by agent library 210, the code associated with that function, or symbol, is executed. The agent library 210 may then execute code associated with the next matching functions, or symbols, in order for the platform-specific implementation of that symbol to be executed.

In some embodiments, expected functions F1, F2, F3, F4, and F5 can correspond to commonly used standard functions, such as those of the standard "libc" library. Overriding functions can thereby be called by the shell 212 or application 214 during normal user activity.

An overriding function contains programming instructions to initiate transmission of an indication that a command line command was issued to the collector 300. The collector 300 can thereby manage and store at database 340 a log of command line commands issued to host 200.

An overriding function can contain instructions to block a command line command according to a local rule 213, or can initiate communication with collector 300 to determine whether to block a command line command invoking the overriding function, as discussed in FIGS. 7 and 8 below.

Figure 5:
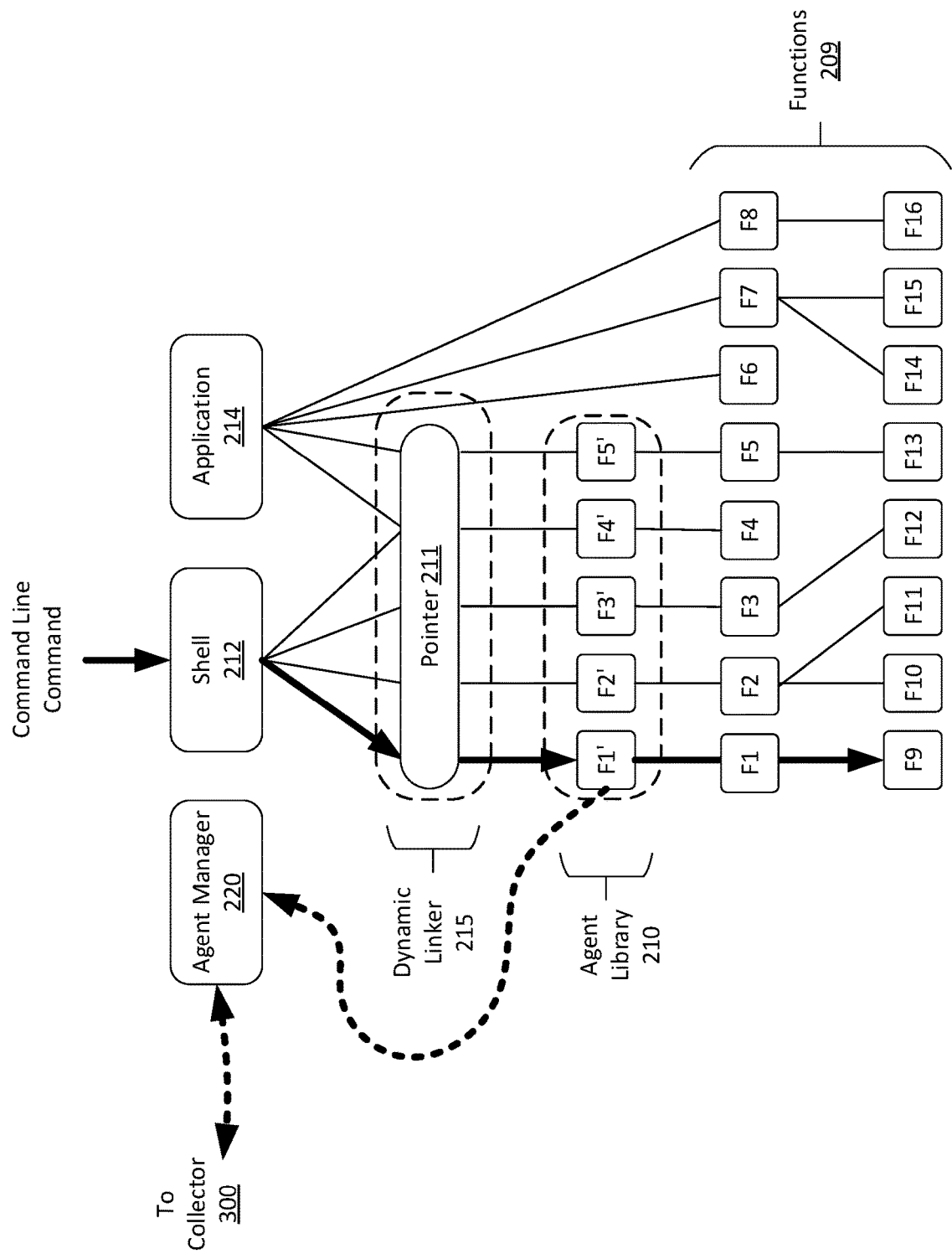
FIG. 5 is a diagram depicting the program architecture of FIG. 4, further depicting the pathway of a function call, according to a non-limiting embodiment.

FIG. 5 is a diagram depicting the program architecture of FIG. 4, further depicting the pathway of a function call, according to a non-limiting embodiment. A command line command is issued to the host 200 and interpreted by shell 212. In the present embodiment, pointer 211 directs the execution of expected function F1 to overriding function F1'. In the present embodiment, overriding function F1' includes instructions to evaluate whether to block the intercepted command line command according to a local rule 213, and includes, where there is connectivity to collector 300, instructions to query collector 300 for evaluation of whether to block the intercepted command line command, as described in greater detail in FIG. 6.

Overriding function F1' further includes instructions to implement expected function F1. In the present embodiment, implementation of expected function F1 is achieved by directly calling the expected function F1. In other embodiments, implementation of expected function F1 may be achieved by executing additional programming instructions to implement a function substantially similar to that of the expected function. In the present embodiment, expected function F1 in turn invokes function F9, to carry out the task requested by the command line command, where the command line command is not blocked.

In the present embodiment, overriding function F1' communicates with collector 300 as mediated by an agent manager 220. Agent manager 220 queues transmissions of intercepted command line commands to the collector 300 and queries to the collector 300. In other embodiments, agent manager 220 may be omitted where queuing functionality is not desired. In still other embodiments, agent manager 220 may comprise programming instructions to implement local rules 213. The functionality of queuing requests and initiating transmission and forwarding of indications of command line commands to collector 300 can be distributed arbitrarily between the agent manager 220 and the overriding functions.

Overriding functions of the agent library 210 also communicate with collector 300 at periodic intervals without prompting by interception of an issued command line command. For example, agent library 210 may periodically query collector 300 for whether collector rules 313 have been updated. As another example, agent library 210 may periodically forward system information, such as connectivity latency between host 200 and collector 300, or other system metadata. The agent library 210 may periodically transmit indications of whether the host session is active, online or offline, queues in the agent manager 220, or other system statistics.

Figure 6:
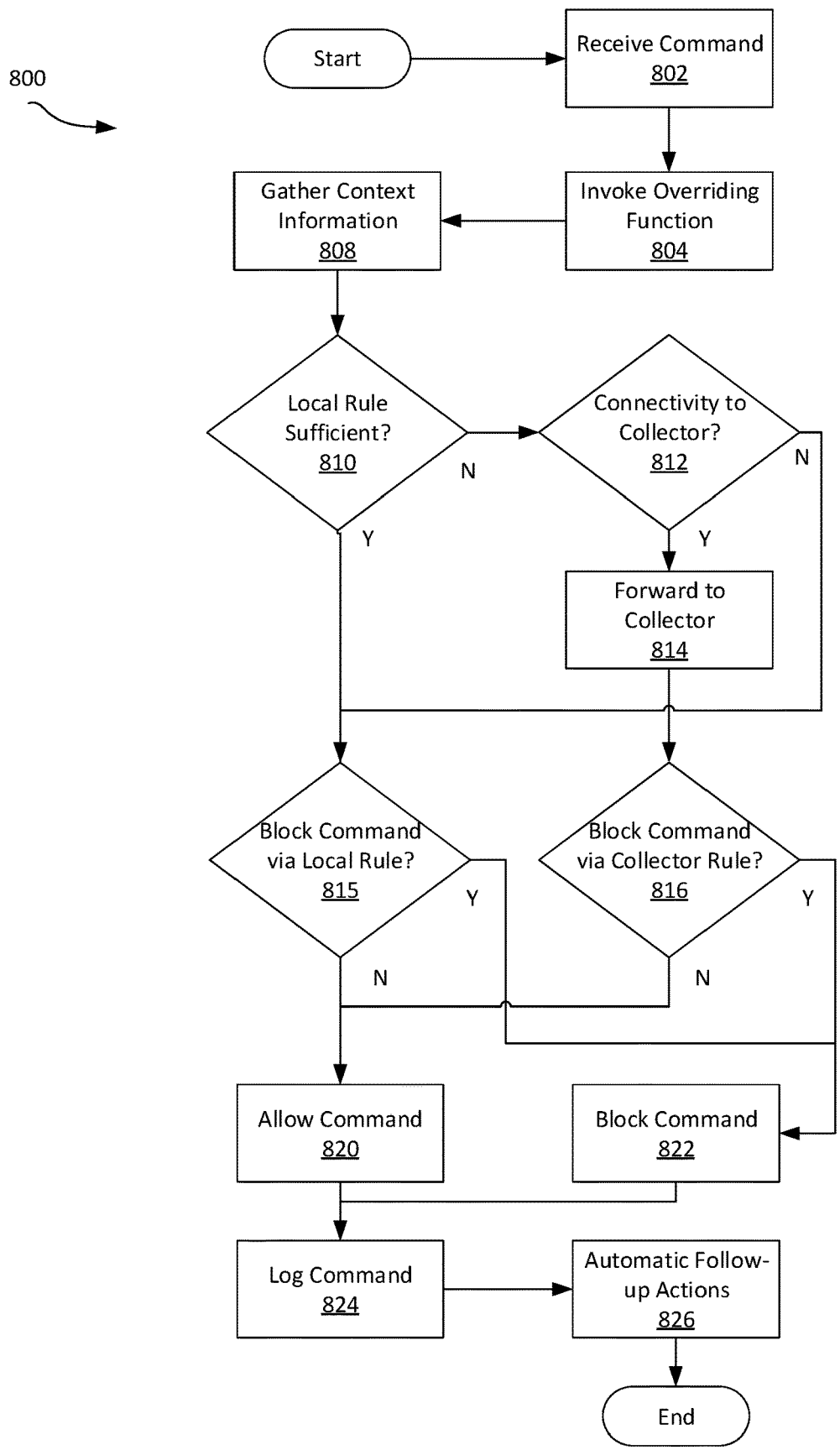
FIG. 6 is a flowchart depicting a method of intercepting commands issued to a host, according to a non-limiting embodiment.

FIG. 6 is a flowchart depicting a method 800 of intercepting command line commands issued to host 200, according to a non-limiting embodiment. The method 800 is one way in which command line commands issued to a host may be monitored and intercepted. It is to be emphasized, however, that the blocks of method 800 need not be performed in the exact sequence as shown. The method 800 is described as performed by a system discussed herein, but this is not limiting and the method can alternatively be performed by other systems.

At block 802, a user issues a command which is received at the host. In the present embodiment, a command is issued to the host 200 by input of a command line command from a user terminal 110 to the command line interface of host 200 via shell 212. For example, a user inputs the command line command "rm -r dbstore/", which on the LINUX operating system indicates that a regular user is instructing host 200 to remove all files and subdirectories recursively in the parent "dbstore/" directory. In other examples, commands to install or uninstall software, check directory contents, check file differences, modify system configurations, etc., may all call on expected functions which have been overridden by agent library 210 and thus may be intercepted. The intercepted command line command is interpreted by the shell 212 which makes the appropriate linkages with the appropriate dynamically linked functions. In the present embodiment where the dynamic linker comprises pointer 211, the dynamically linked functions invoked by the command line command include overriding functions.

Although in the present embodiment a command line command is input to the host 200 from a user terminal 110, in other embodiments, it is contemplated that commands may be received at the host 200 in other ways, such as, for example, input through a shell script, commands input directly through an input device coupled with the host 200, or an application containing instructions to call a function, through a graphical-user-interface, or other ways. As an example, although a user may compare the contents of two files by entering a "diff" command, an application running on the host may similarly compare the contents of two files without the command being entered directly by the user. In such an instance, the "diff" command is considered to be issued to the host, and the underlying standard functions relied on by the "diff" function may be overridden, and thereby an indication of the command is transmitted to collector 300. As another example, transmission of encryption keys and validation signatures may be similarly intercepted.

At block 804, an overriding function is invoked. In the present example, the "remove" command in "rm -r dbstore/" would be expected to invoke function F1, but the dynamic linker points to overriding function F1', which is invoked.

At block 808, context information is gathered. For example, the user identity may be determined for incorporation into evaluation of whether to block the command line command. Context information associated with the intercepted command can include the user identity, any user groups to which the user belongs, the time of issuance of the command according to the user, environmental information and configuration of the host 200, and information gathered by built-in audit capabilities of host 200.

With function F1' invoked, the command line command can be evaluated before implementation of expected function F1, as described in blocks 810, 812, 815 and 816. In the present embodiment, the intercepted command can be evaluated at the relevant overriding function F1' of the agent library 210 or collector 300, but it is contemplated that in other embodiments evaluation may also take place at the agent manager 220.

At block 810, it is determined whether a local rule 213 can sufficiently evaluate whether to block the command line command based on the context information available on the host 200. For example, a local rule 213 may simply limit execution of the "remove" command to a particular group of users regardless surrounding circumstances, or if the command line command is issued within a particular timeframe on the user terminal 110 issuing the command, and thus may be able to determine that the "rm -r dbstore/" command is to be blocked based on user information alone. Other context information available on the host 200 may include previously issued command line commands or parent/child relationships of the files and directories referenced in the command line command.

In other examples, however, the overriding function F1' may require the real-world location of the user issuing the command, which may not be available on host 200, in order to make a determination as to whether to block the command. Where a local rule 213 is sufficient, block 815 is executed to evaluate the local rule 213. Where a local rule 213 is not sufficient, block 812 is executed to check for connectivity to collector 300.

At block 812, in the case where a local rule 213 not sufficient, it is determined whether there is connectivity to collector 300. Where connectivity is present, block 814 is executed to forward indications of the command line command to collector 300. Where connectivity is not present, block 815 is executed to revert to the local rule 213.

At block 814, indications of the command line command are forwarded to collector 300. Where there is connectivity to collector 300, indications of the command line command is forwarded for along with context information associated with the command line command for evaluation of whether to block the command. Context information associated with the command line command can include the user, any user groups to which the user belongs, the time of issuance of the command according to the user, and other context information, including information relating to the environment and configuration of the host 200 as required by collector 300, and information gathered by built-in audit capabilities of host 200.

At block 815, evaluation of the local rule 213 takes place on the host within overriding function F1'. For example, a local rule 213 may be sufficient without need for supplemental information from collector 300, or there may be no connectivity to collector 300, requiring the overriding function F1' to make a determination based on a local rule 213. In some embodiments, evaluation of the local rule 213 may take place at the agent manager 220. In some embodiments, the overriding function F1' may initiate a request for secondary authentication from the user before permitting execution of the command line command. In some embodiments, the required secondary authentication may comprise a time-based multi-factor authentication code which is periodically pushed from collector 300. In instances where connectivity to collector 300 is not present, a token-based override code, for example, may be used.

At block 816, where indications of the command line command are forwarded to collector 300 for evaluation, a collector rule 313 is used to evaluate whether to block the command line command. Collector 300 may then access supplementary information stored on third party information systems 330. Such supplementary information may include, for example, real-world IP address information of the terminal issuing the command line command, the real-world location of the host 200 or user terminal 110, or a timestamp of the command line command verified by a third party.

At block 820, the intercepted command is allowed to be executed unblocked. In the present example, overriding function F1' calls expected function F1, which in turn calls function F9, and other functions as appropriate, to complete the task requested by the command.

At block 822, the command is blocked. In the present example, overriding function F1' does not make a function call to expected function F1 or otherwise implement expected function F1.

At block 824, whether the command was blocked or not, indications of the command line command are logged. Where connectivity to collector 300 is present, indications are logged at collector 300. Where connectivity to collector 300 is not present and an agent manager 220 is present, indications for logging can be queued until connectivity is present. Indications of the command line command are logged along with other context information relating to the command line command. Where a command has been permitted to be executed, additional context information, particularly the output of the intercepted command line command, may also be logged at collector 300.

At block 826, the collector takes automatic follow-up actions. Automatic follow-up actions include actions taken after an intercepted command line command is logged and block or permitted.

For example, in cases where a local rule 213 blocks or permits an intercepted command line command, each intercepted command line command can be evaluated a second time based on collector rules 313. The collector 300 can store the results of the evaluation based on collector rules 313, thereby providing a detailed track record of activity taking place on host 200 for record-keeping purposes. Less severe conflicts between local rule 213 evaluations and collector rule 313 evaluations can be notified to an administrator. More severe conflicts, especially while a user session is still active, such as, for example, where connectivity to the collector 300 fails during an ongoing session during which prohibited activities take place, the user session may automatically be terminated or prompted for further authorization.

As another example, collector 300 may generate and send an e-mail or other notice to an administrator when, for example, a certain command is issued to host 200 outside of expected working hours.

Figure 7:
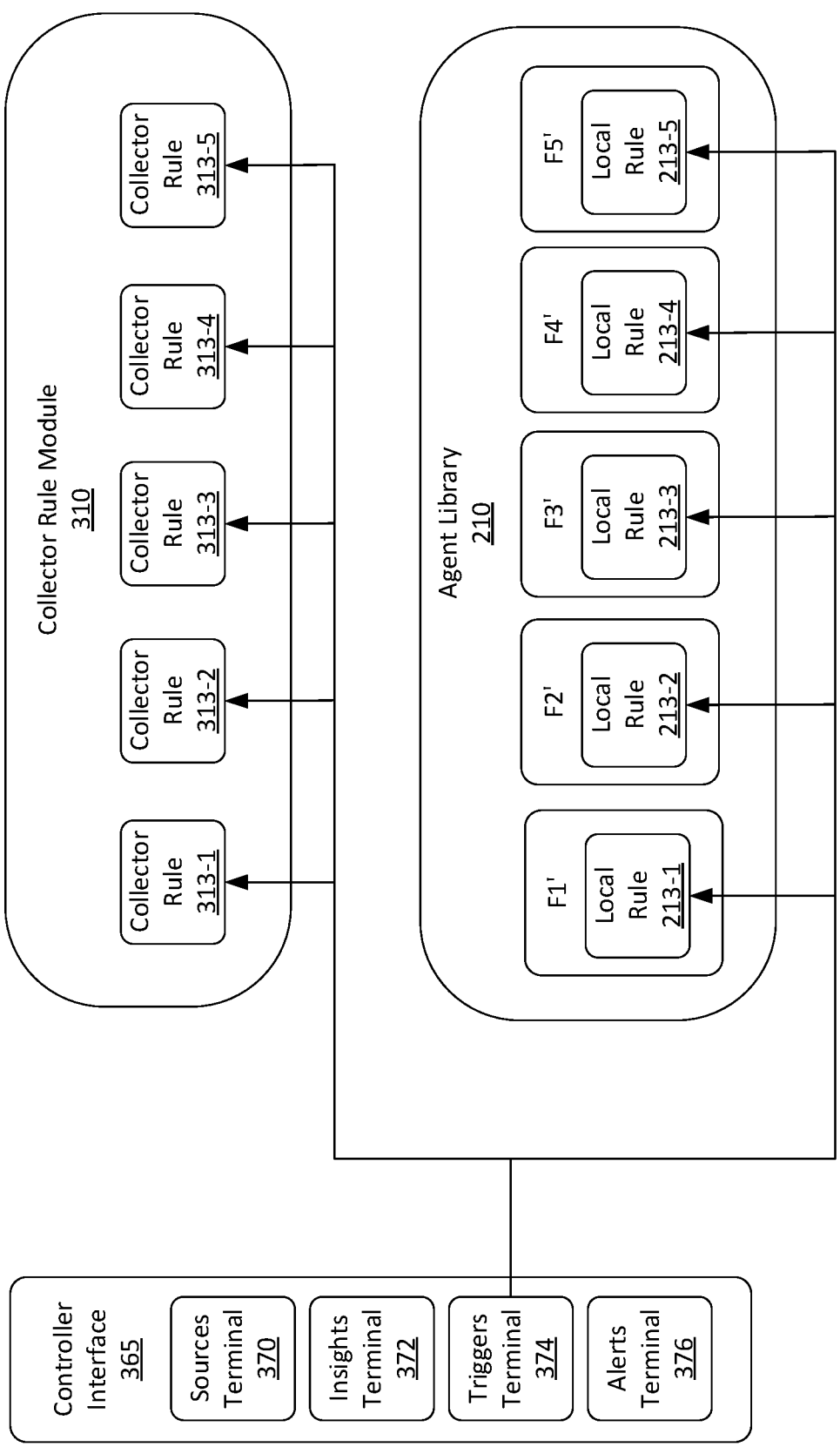
FIG. 7 is a block diagram depicting local rules and collector rules configurable by a controller interface, according to a non-limiting embodiment.

FIG. 7 is a block diagram depicting local rules 213 and collector rules 313 configurable by interface 365, according to a non-limiting embodiment. In the present embodiment, the interface 365 comprises terminals or tabs for organizing data accessible from databases 340 and collector 300 and functionality available to an administrator. In the present embodiment, for exemplary purposes only, the interface 365 comprises a "sources" terminal 370 showing a dashboard of the geographic location of users running active or past user sessions, an "insights" terminal 372 showing a dashboard of patterns of user activity, a "triggers" terminal 374 for adjusting collector rules 313 on the collector 300, pushing local rules 213 to the host 200, and setting automatic follow-up actions to be carried out by collector 300. The interface 365 further comprises an "alerts" terminal 376 for identifying problematic command line commands intercepted during a user's session and for viewing past sessions of a user. The interface 365 includes functionality to disconnect a given users' session. It is contemplated that in other embodiments the data accessible from databases 340 and collector 300 and the functionality available to an administrator may be presented in other ways.

In agent library 210 the overriding functions F1', F2', F3', F4', F5' comprise local rules 213 for determining whether to block execution of the intercepted command line command, or to query collector 300 for determination of whether to block the intercepted command line command according to collector rules 313, as discussed above. Local rules are depicted as local rules 213-1, 213-2, 213-3, 213-4, and 213-5, each associated with a respective overriding function. In the present embodiment, local rules 213 can be configured by an administrator operating the triggers terminal 374 of interface 365 and pushed to the agent library 210.

Collector rule module 310 comprises collector rules 313 for determining whether a command line command is to be blocked or whether other action is to be taken, as discussed above. In the present embodiment, each of the collector rules 313 is associated with a local rule 213 to provide two layers of evaluation. Collector rules 313 can be configured by an administrator operating the triggers terminal 374 of interface 365.

Thus, an administrator accessing interface 365 can parse user activity data, search through and identify patterns of activity within the collected data, review past logs of a user's activity, configure collector rules 313 or configure and push local rules 213 to the agent library 210.

In the present embodiment, local rules 213 and collector rules 313 comprise command signatures. In the present embodiment, command signatures are expressed in Reverse Polish notation (RPN). Expressing command signatures in RPN allows a decision tree to be compressed into a single line item which can be evaluated to determine a Boolean result of whether a command is to be blocked or not. For example, the line item "=(commandtype)(LS)" indicates that where the command type is "list", the command is to be blocked. As another example, "=(commandtype)(LS),>(timestamp)(17:00/EST/14/7/2017)" indicates that where the command type is "List Directory Contents" and the command is issued after 5:00 pm eastern standard time on Jul. 14, 2017, the command is to be blocked.

In the present embodiment, expressing command signatures in PN provides for an efficient way of expressing a rule in a single line item, but it is contemplated that other methods for evaluating rules may be employed.

It can thus be seen that command line commands issued to the host 200 can be intercepted and logged at collector 300. The overriding functions of agent library 210 can include local rules 123 for blocking intercepted command line commands where connectivity to collector 300 is not necessary or not available. The collector 300 can include collector rules 313 for blocking intercepted command line commands informed by supplemental information from third party information systems 330. A user's activity can thereby be managed automatically by local or collector rules 313, with control initiated directly on the host.

Having the system installed directly on the host provides centralized control that is agnostic of whether the host is being accessed directly, through a user terminal 110, or indirectly by remote access from other systems.

Furthermore, having simple local rule 213 evaluation take place directly on the host 200 while having more complicated collector rule 313 evaluation take place off of the host efficiently manages host processing power as well as network load.

Whether a command is blocked or not, indications of command line commands are logged, along with the available context information, at the collector 300 for review by an administrator. Indications of command line commands and context information can be stored at databases 340, accessible by admin terminals 120 through the interface 365 of controller 360. A user's activity can thereby be monitored by an administrator.

Furthermore, where an administrator desires to actively regulate user behavior on host 200, the administrator may use the log of intercepted command line commands, for example of a particular user session, along with context information associated with each command, to make determinations. Given the greater context provided by viewing a log of a user's session, context information available on the host 200, and with additional third party supplementary information, the administrator is empowered to make context determinations as to the legitimacy of actions taken by the user, and whether any manual administrative action should be taken. For example, while an administrator is observing a user issue commands to host 200, the administrator may manually choose to disconnect the user's session. In other examples, an administrator may review past logs of a user's activity and choose to modify collector rules 313 on collector rule module 310 or to push additional local rules 213 to the agent library 210.

Variations of the embodiments described herein are contemplated. As described above, for example, although it is contemplated that a user may interact with the host via a command line interface, and command line commands are thereby intercepted when issued to the host, it is contemplated, as discussed above that user activity which calls upon functions overridden by the agent library may also be intercepted. it is contemplated that commands may be issued to the host 200 in other ways, such as, for example, input through a shell script, commands input directly through an input device coupled with the host, or an application containing instructions to call a function, through a guided-user-interface, or other ways.

The scope of the claims should not be limited by the embodiments set forth in the above examples, but should be given the broadest interpretation consistent with the description as a whole.

What is claimed is:

1. A system for intercepting commands issued to a host, the system comprising:
   a collector configured to receive and log indications of commands;
   an agent installed on the host, the agent comprising an agent library comprising an overriding function to override an expected function callable on the host by a program executable by the host, the overriding function comprising instructions to initiate transmission to the collector an indication of a command that invokes the expected function, initiation of transmission being responsive to the command being issued to the host, the overriding function further comprising instructions to implement the expected function, the overriding function further comprising instructions to withhold execution of the command that invokes the expected function according to a local rule, the local rule comprising a local command signature; and
   a server in communication with the collector and configured to retrieve and output the indications of commands logged by the collector;
   wherein the collector further comprises instructions to withhold execution of the command that invokes the expected function according to a collector rule, the collector rule comprising a collector command signature;
   wherein the server comprises an interface for configuring collector command signatures and for configuring and pushing local command signatures to the agent.

2. The system of claim 1, further comprising an agent manager installed on the host for caching indications of commands before transmission to the collector.

3. The system of claim 1, wherein evaluation of the collector rule is informed by supplementary information from third party information systems.

4. The system of claim 1, wherein the overriding function further comprises instructions to transmit context information to the collector for logging, the context information associated with the command that invokes the expected function.

5. The system of claim 1, wherein the overriding function comprises instructions to call the expected function to implement the expected function.

6. A method for intercepting commands issued to a host, the method comprising:
   receiving a command at the host;
   invoking an overriding function which overrides an expected function callable on the host, the overriding function comprising instructions to transmit an indication of the command to a collector;
   transmitting an indication of the command to the collector;
   withholding execution of the command that invokes the expected function according to a local rule or a collector rule, the local rule comprising a local command signature, the collector rule comprising a collector command signature;
   configuring the collector command signature for the collector rule; and
   configuring the local command signature for the local rule and pushing the local command signature to the host.

7. The method of claim 6, wherein the overriding function comprises instructions to transmit an indication of the command to a collector responsive to the command being issued to the host.

8. The method of claim 6, wherein, prior to the transmitting, the method further comprises gathering context information related to the command, and wherein the transmitting includes transmitting the context information to the collector.

9. The method of claim 6, wherein the method further comprises evaluating the command according to a collector rule, evaluation of the collector rule informed by supplementary information from third party information systems.

10. The system of claim 1, wherein the interface is configured to display intercepted command line commands issued to the host.

11. The system of claim 1, wherein the interface is configured to display activity of active or past user sessions at the host.

12. The system of claim 1, wherein the interface is enabled to disconnect a user session at the host.

13. The method of claim 6, further comprising displaying intercepted command line commands issued to the host.

14. The method of claim 6, further comprising displaying activity of active or past user sessions at the host.

15. The method of claim 6, further comprising displaying geographic locations of users running active or past user sessions at the host.

16. The method of claim 6, further comprising disconnect a user session at the host.

* * * * *